No. 713,528. Patented Nov. 11, 1902.
J. SULLIVAN.
HORSE APRON.
(Application filed Aug. 9, 1902.)
(No Model.)
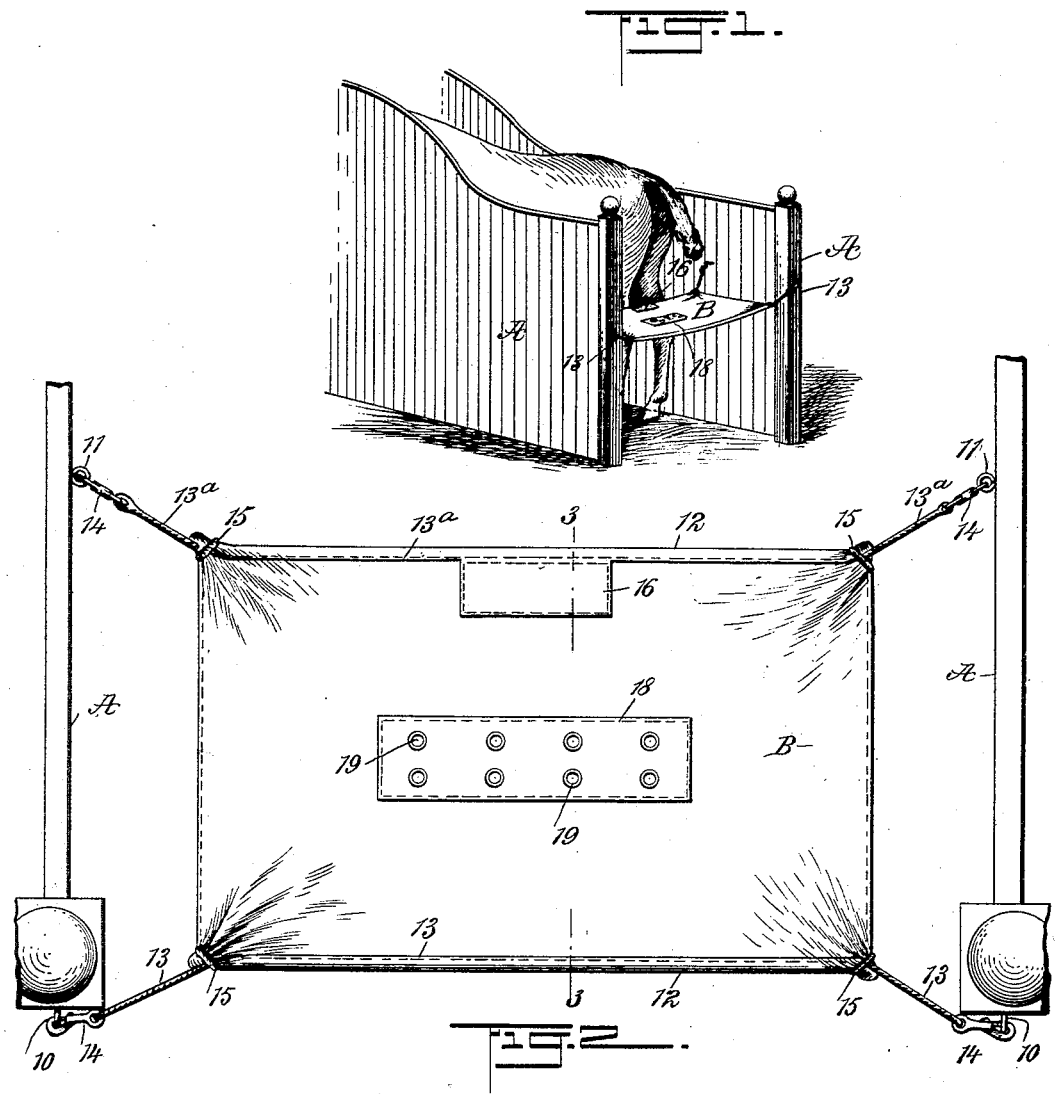
INVENTOR
James Sullivan
BY Munn & Co
ATTORNEYS.

UNITED STATES PATENT OFFICE.

JAMES SULLIVAN, OF NEW YORK, N. Y.

HORSE-APRON.

SPECIFICATION forming part of Letters Patent No. 713,528, dated November 11, 1902.

Application filed August 9, 1902. Serial No. 119,112. (No model.)

*To all whom it may concern:*

Be it known that I, JAMES SULLIVAN, a citizen of the United States, and a resident of the city of New York, borough of Manhattan, in the county and State of New York, have invented a new and Improved Horse-Apron, of which the following is a full, clear, and exact description.

My invention relates to an improvement in horse-aprons adapted to catch and retain excrement, and thereby keep a stall clean; and the purpose of the invention is to so construct the apron that it may be expeditiously and conveniently attached to or detached from a stall and which when attached to a stall will occupy a horizontal position immediately at the rear of the animal below the rump.

Another purpose of the invention is to provide means whereby should the animal in lying down tilt the apron it will automatically resume its normal horizontal position, and thus avoid spilling its contents, and, furthermore, to so construct the apron that any fluid received therein will speedily find an exit at the central portion of the apron.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a stall and the improved apron applied thereto. Fig. 2 is a plan view of a portion of a stall and a plan view of the apron; and Fig. 3 is a transverse section through the apron, taken practically on the line 3 3 of Fig. 2.

A represents the side walls of a stall, and the posts at the entrance of the stall are provided with eyes 10, preferably at their outer or front faces, and other eyes 11 are secured in the inner faces of the side walls of the stall a predetermined distance from the entrance of the stall. The eyes 10 and 11 at each side of the stall are preferably in horizontal alinement, and the eyes are located at any suitable point between the top and bottom of the side walls of the stall.

B represents the improved apron, which is of rectangular shape and of less length than the width of the stall, and the said apron is made of canvas or other suitable material, canvas being usually employed. A hem 12 is formed at each longitudinal edge of the apron, one hem facing the entrance of the stall and the other hem the manger end of the stall. Ropes 13 and 13ᵃ are carried through the said hems and extend a suitable distance out beyond the ends of the apron at the corners of the same, as is shown in Figs. 1 and 2. At the extremity of each extended end of each rope 13 and 13ᵃ a snap-hook 14 is attached, and these snap-hooks are made to engage with the eyes 10 and 11 at the sides of the stall when the apron is set up, whereby the apron will occupy substantially a horizontal position and the manger side of the apron is brought close to the legs of the animal a suitable distance below the rump. In order to strengthen the apron as much as possible, brace-loops 15, of rope or like material, are tightened around the apron at its corners, as shown in Fig. 2.

As the apron is brought in close engagement with the animal, should the animal attempt to lie down the apron will be more or less lifted up at that end in engagement with the animal and tilted in direction of the entrance to the stall, and should the apron remain in this position its contents would be very liable to drop off. In order to restore the apron to its horizontal or normal position as soon as it is out of engagement with the animal, a pocket 16 is formed at the central portion of the manger side of the apron B, and in this pocket a weight 17 is located, which acts to quickly restore the apron to its proper position both when the apron is raised by the animal lying down and when the animal makes an effort to regain his feet.

At the central portion of the apron a reinforcing-strip 18 is longitudinally secured to the body of the apron, and eyeleted openings 19 are produced in the reinforcing-strip and in the body of the apron, as is shown in Figs. 2 and 3, to permit a ready exit of any fluid matter which the apron may receive.

It is obvious that the apron may be quickly put up and taken down and that when it is to be emptied it need only be disengaged from the stall at one of its ends and the loosened end be permitted to drop into a barrow or other receptacle adapted to receive the contents of the apron. Furthermore, the apron is very simple and durable in its construction and when not required may be left attached to one side of the stall and be thrown over the upper edge of that side.

Having thus described my invention, I claim as new and desire to secure by Letters Patent—

1. A horse-apron, comprising a body, flexible extensions from the corners of the body, fastening devices carried by the said corner extensions, and a weight at one side edge of the apron, for the purpose specified.

2. A horse-apron consisting of a body of a pliable material reinforced at its center and provided at its reinforced portion with eyeleted openings, the said apron being provided with a pocket adjacent to one longitudinal edge, a weight in the said pocket, ropes extending from the corners of the apron, and snap-hooks carried by the said ropes, for the purpose described.

In testimony whereof I have signed my name to this specification in the presence of two subscribing witnesses.

JAMES SULLIVAN.

Witnesses:
J. FRED. ACKER,
EVERARD BOLTON MARSHALL.